United States Patent
Xu et al.

(10) Patent No.: US 10,863,477 B2
(45) Date of Patent: Dec. 8, 2020

(54) METHODS FOR SUPPORTING ACCESS AND PAGING OF LOW COMPLEXITY USER EQUIPMENT

(71) Applicant: Samsung Electronics Co., Ltd., Suwon-si (KR)

(72) Inventors: Lixiang Xu, Beijing (CN); Xiaowan Ke, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/557,381

(22) Filed: Aug. 30, 2019

(65) Prior Publication Data

US 2019/0387497 A1 Dec. 19, 2019

Related U.S. Application Data

(63) Continuation of application No. 15/502,380, filed as application No. PCT/KR2015/007949 on Jul. 29, 2015, now Pat. No. 10,405,296.

(30) Foreign Application Priority Data

Aug. 7, 2014 (CN) .......................... 2014 1 0386790

(51) Int. Cl.
*H04W 68/02* (2009.01)
*H04W 36/08* (2009.01)
(Continued)

(52) U.S. Cl.
CPC ............. *H04W 68/02* (2013.01); *H04W 8/24* (2013.01); *H04W 36/08* (2013.01); *H04W 36/30* (2013.01); *H04W 68/005* (2013.01); *H04W 92/20* (2013.01); *H04W 36/0061* (2013.01); *H04W 36/0083* (2013.01)

(58) Field of Classification Search
CPC ........ H04L 29/08108; H04M 2207/18; H04W 4/02
USPC ...... 455/436, 414.1, 466, 442, 432.1, 435.1; 370/331
See application file for complete search history.

(56) References Cited

U.S. PATENT DOCUMENTS 10,405,296 B2 * 9/2019 Xu
2010/0178941 A1 7/2010 Chun et al.
(Continued)

OTHER PUBLICATIONS

Ericsson; Paging enhancements for Low Complexity UE; SA WG2 Meeting #104; S2-142529; Jul. 7-11, 2014; Dublin, Ireland.
(Continued)

*Primary Examiner* — Nghi H Ly
(74) *Attorney, Agent, or Firm* — Jefferson IP Law, LLP

(57) ABSTRACT

An embodiment of the present disclosure provides a method for supporting paging of a low complexity UE, including: determining, by a target base station during handover of a UE, whether a source base station during the handover supports low complexity UE, and transmitting paging capability information of the UE to a Mobility Management Entity MME in response to determining that the source base station does not support low complexity UE, wherein the paging capability information of the UE is used by the MME for paging the UE. The method provided by embodiments of the present disclosure is able to enhance paging with respect to the low complexity UE.

16 Claims, 14 Drawing Sheets

(51) Int. Cl.
    *H04W 92/20*     (2009.01)
    *H04W 8/24*     (2009.01)
    *H04W 68/00*     (2009.01)
    *H04W 36/30*     (2009.01)
    *H04W 36/00*     (2009.01)

(56) References Cited

U.S. PATENT DOCUMENTS

| | | |
|---|---|---|
| 2011/0080894 A1 | 4/2011 | Iwamura et al. |
| 2012/0044910 A1 | 2/2012 | Maeda et al. |
| 2012/0250501 A1 | 10/2012 | Lee |
| 2013/0012244 A1 | 1/2013 | Lee et al. |
| 2014/0105158 A1* | 4/2014 | Kim .................. H04W 72/042 370/329 |
| 2015/0141062 A1 | 5/2015 | Ostrup et al. |
| 2016/0309448 A1* | 10/2016 | Truelove ................ H04W 8/22 |

OTHER PUBLICATIONS

SA WG2; LS Response on eNB knowledge of low complexity UEs; 3GPP TSG-SA2 Meeting #104; Tdoc S2-142936; Jul. 11, 2014; Dublin, Ireland.

\* cited by examiner

METHODS FOR SUPPORTING ACCESS AND PAGING OF LOW COMPLEXITY USER EQUIPMENT

CROSS-REFERENCE TO RELATED APPLICATION(S)

This application is a continuation application of prior application Ser. No. 15/502,380, filed on Feb. 7, 2017, which is a U.S. National Stage application under 35 U.S.C. § 371 of an International application number PCT/KR2015/007949, filed on Jul. 29, 2015 and was based on and claimed priority under 35 U.S.C. § 119(a) of a Chinese patent application number 201410386790.1, filed on Aug. 7, 2014, in the Chinese Intellectual Property Office, the disclosure of which is incorporated by reference herein in its entirety

TECHNICAL FIELD

The present disclosure relates to radio communication techniques, and more particularly, to methods for supporting access and paging of a low complexity UE.

BACKGROUND ART

Modern mobile communications have a growing tendency to provide users with multimedia services with high transmission rate. FIG. 1 provides system architecture of System Architecture Evolution (SAE), in which, User equipment (UE) 101 is a terminal device used for receiving data. Evolved-Universal Terrestrial Radio Access Network (E-UTRAN) 102 is a wireless access network, including a macro base station (eNodeB/NodeB) providing an interface to the UE for accessing the wireless network. Mobility Management Entity (MME) 103 is responsible for managing mobile context, session context and security information of the UE. Serving Gateway (SGW) 104 is mainly responsible for providing user plane functions. The MME 103 and the SGW 104 may be deployed in a same physical entity. Packet Data Gateway (PGW) 105 is responsible for functions such as charging and legal monitoring and may be in the same physical entity with the SGW 104. Policy and Charging Rules Function (PCRF) 106 provides Quality of Service (QoS) polices and charging rules. Serving GPRS Support Node (SGSN) 108 is a network node device in Universal Mobile Telecommunications System (UMTS) for providing routes for data during transmission. Home Subscriber Server (HSS) 109 is a home subscriber subsystem of the UE, responsible for protecting user information of the user equipment such as current location, location of a serving-node, user security information, and packet data context of the user equipment.

The interface between the eNB and the MME is an S1 interface. The interface between eNBs is an X2 interface.

DISCLOSURE OF INVENTION

Technical Problem

In order to support low complexity UE, base station requires update. Legacy base stations which have been deployed but not upgraded do not support low complexity UE. When a low complexity UE accesses a base station not supporting low complexity UE, the base station not supporting low complexity UE cannot serve the UE properly. Therefore, existing techniques do not solve problems including how to avoid bad user experience of low complexity UE and unnecessary network procedure and resource waste.

In order to support enhancement of paging of low complexity UE in the LTE system, the eNB needs to know information of the low complexity UE, and eNB also needs to transmit the information of the low complexity UE to the MME

Solution to Problem

A method for supporting paging of a low complexity UE, including:

determining, by a target base station during handover of a UE, whether a source base station during the handover supports low complexity UE, and transmitting paging capability information of the UE to a Mobility Management Entity MME in response to determining that the source base station does not support low complexity UE, wherein the paging capability information of the UE is used by the MME for paging the UE.

Preferably, the determining by the target base station whether the source base station during the handover supports low complexity UE includes:

obtaining, by the target base station, information indicating whether an neighbor base station of the target base station supports low complexity UE via operating and maintaining Q&M configurations; or obtaining, by the target base station, information indicating whether an neighbor base station of the target base station supports low complexity UE via an X2 setup procedure; or obtaining, by the target base station, information indicating whether an neighbor base station of the target base station supports low complexity UE via an S1 interface; or obtaining, by the target base station, whether the source base station supports low complexity UE via the UE.

Preferably, the obtaining by target base station the information indicating whether the neighbor base station of the target base station supports low complexity UE via the X2 setup procedure includes:

transmitting, by the neighbor base station of the target base station, an X2 setup request message to the target bases station and indicating whether the neighbor base station supports low complexity UE in the X2 setup request message; transmitting, by the target base station, an X2 setup response message to the neighbor base station and indicating whether the target base station supports low complexity UE in the X2 setup response message.

Preferably, the X2 setup request message or the X2 setup response message includes indication information indicating support of low complexity UE, used for indicating that the neighbor base station or the target base station supports low complexity UE; the X2 setup request message or the X2 setup response message does not includes the indication information indicating support of low complexity UE, used for indicating that the neighbor base station or the target base station does not support low complexity UE.

Preferably, the obtaining by the target base station the information indicating whether the source base station supports low complexity UE via the UE includes:

broadcasting, by the source base station, information indicating whether the source base station supports low complexity UE; and receiving, by the target base station from the UE, the information indicating whether the source base station supports low complexity UE determined by the UE according to the broadcast of the source base station.

Preferably, before the target base station receives from the UE the information indicating whether the source base station supports low complexity UE, the method further includes: requesting, by the target base station, the UE to report the information indicating whether the source base station supports low complexity UE.

Preferably, the obtaining by target base station the paging capability information of the UE includes:

transmitting, by the target base station, a UE capability enquiry message to the UE for requesting the paging capability information of the UE; and receiving, by the target base station, UE capability information transmitted by the UE, wherein the UE capability information includes the paging capability information of the UE.

Preferably, the transmitting by the target base station the paging capability information of the UE to the MME includes:

transmitting, by the target base station, the paging capability information of the UE to the MME via a UE capability information indication or a path switch request or a path switch request acknowledgement or a handover notify or a self-defined S1 message.

A method for supporting paging of a low complexity User Equipment UE, including:

during handover of a UE from a source base station to a target base station, if the target base station does not receive, from the source base station, paging capability information of the UE or information indicating that the paging capability information of the UE is transmitted to a Mobility Management Entity MME, transmitting, by the target base station, the obtained paging capability information of the UE to the MME, wherein the paging capability information of the UE is used by the MME for paging the UE.

Preferably, the paging capability information of the UE or the information indicating that the paging capability information of the UE is transmitted to the MME is transmitted to the target base station via a handover request message of an X2 interface, or is transmitted to the target base station via a handover required message and a handover request message of an S1 interface.

Preferably, the obtaining by the target base station the paging capability information of the UE includes:

transmitting, by the target base station, a UE capability enquiry message to the UE for requesting the paging capability information of the UE; and receiving, by the target base station, UE capability information returned by the UE, wherein the UE capability information includes the paging capability information of the UE.

Preferably, the transmitting by the target base station the paging capability information of the UE to the MME includes:

transmitting, by the target base station, the paging capability information of the UE to the MME via a UE capability information indication or a path switch request or a handover request acknowledgement or a handover notify of a self-defined S1 message.

A method for paging low complexity User Equipment UE, including:

receiving, by a base station, UE paging capability required indication transmitted by a Mobility Management Entity MME, wherein the UE paging capability required indication is used for indicating the base station to report paging capability information of the UE to the MME; and after receiving the UE paging capability required indication, transmitting, by the base station, the obtained paging capability information of the UE to the MME, wherein the paging capability information of the UE is used by the MME for paging the UE.

Preferably, the UE paging capability required indication is transmitted to the base station via an initial context setup request message or a path switch request acknowledgement message during an X2 handover or a handover request message during an S1 handover.

Preferably, the base station obtains the paging capability information of the UE by:

transmitting, by the base station, a UE capability enquiry message to the UE for requesting the paging capability information of the UE; and receiving, by the base station, UE capability information returned by the UE, wherein the UE capability information includes the paging capability information of the UE.

Preferably, the base station is a target base station during a handover procedure, the base station obtains the paging capability information of the UE by: receiving, by the target base station, the paging capability information of the UE from a source base station of the handover.

Preferably, the transmitting by the base station the paging capability information of the UE to the MME includes:

transmitting, by the base station, the paging capability information of the UE to the MME via a UE capability information indication or a handover request acknowledgement or a handover notify or an initial context setup response or a self-defined S1 message.

Preferably, the base station is a base station that the UE accesses when changing from an idle state or an active state, or is a target base station during the handover procedure.

A method for supporting paging of low complexity User Equipment UE, including:

if a base station does not detect paging capability information of a UE in a predefined message transmitted by a Mobility Management Entity MME or a source base station during handover, transmitting, by the base station, obtained paging capability information of the UE to the MME, wherein the paging capability information of the UE is used by the MME to page the UE.

Preferably, the predefined message is an initial context setup request message transmitted by the MME, or an X2 handover request message transmitted by the source base station during handover of the UE; or an S1 handover request message transmitted by the MME.

Preferably, the base station obtains the paging capability information of the UE by:

transmitting, by the base station, a UE capability enquiry request to the UE for requesting the paging capability information of the UE; and receiving, by the base station, UE capability information returned by the UE, wherein the UE capability information includes the paging capability information of the UE.

Preferably, the transmitting by the base station the paging capability information of the UE to the MME includes:

transmitting, by the base station, the paging capability information of the UE to the MME via a UE capability information indication or a handover request acknowledgement or a handover notify or an initial context setup response or a self-defined S1 message.

Preferably, the base station is a base station that the UE accesses when changing from an idle state to an active state, or a target base station during a handover procedure.

A method for supporting access of low complexity User Equipment UE, including:

obtaining, by a serving base station of a UE, information indicating whether an neighbor base station of the serving base station supports low complexity UE; and if the UE is a low complexity UE, handing over, by the serving base station, the UE to an neighbor base station which supports low complexity UE during handover of the UE.

Preferably, the obtaining by the serving base station the information indicating whether the neighbor base station supports low complexity UE includes:

obtaining, by the serving base station, the information indicating whether the neighbor base station supports low complexity UE via operating and maintaining Q&M configurations; or obtaining, by the serving base station, the information indicating whether the neighbor base station supports low complexity UE via an X2 setup procedure; or obtaining, by the serving base station, the information indicating whether the neighbor base station supports low complexity UE via an S1 interface; or obtaining, by the serving base station, the information indicating whether the neighbor base station supports low complexity UE via the UE.

Preferably, the obtaining by the serving base station the information indicating whether the neighbor base station supports low complexity UE via the X2 setup procedure includes:

transmitting, by the neighbor base station of the serving base station, an X2 setup request message to the serving base station and indicating in the X2 setup request message whether the neighbor base station supports low complexity UE, transmitting, by the serving base station, an X2 setup response message to the neighbor base station and indicating in the X2 setup response message whether the serving base station supports low complexity UE.

Preferably, the X2 setup request message or X2 setup response message includes indication information indicating support of low complexity, used for indicating that the neighbor base station or the serving base station supports low complexity UE; the X2 setup request message or the X2 setup response message does not includes the indication information indicating support of low complexity UE, used for indicating that the neighbor base station or the serving base station does not support low complexity UE.

Preferably, the obtaining by the serving base station the information indicating whether the neighbor base station supports low complexity UE via the UE includes:

broadcasting, by the neighbor base station of the serving base station, information indicating whether the neighbor base station supports low complexity UE; and receiving, by the serving base station from the UE, the information indicating whether the neighbor base station supports low complexity UE determined by the UE according to the broadcast of the neighbor base station.

preferably, before the serving base station receives from the UE the information indicating whether the neighbor base station supports low complexity UE, the method further includes: requesting, by the serving base station, the UE to report the information indicating whether the neighbor base station supports low complexity UE.

A method for supporting access of low complexity User Equipment UE, including:

during handover of a low complexity UE, receiving, by a target base station directly or via a Mobility Management Entity MME, information indicating that the handover UE is a low complexity UE from a source base station; if the target base station does not support low complexity UE, transmitting, by the target base station directly or via the MME, a handover failure message to the source base station, and indicating that a failure reason is the target base station does not support low complexity UE.

Preferably, after the target base station transmits the handover failure message to the source base station directly or via the MME, the method further includes: saving, by the source base station, information indicating that the target base station does not support low complexity UE, and not initiating handover of low complexity UE to the target base station again.

An apparatus for supporting paging of low complexity User Equipment UE, including: a determining unit and a paging capability transmitting unit;

the determining unit is adapted to determine, after the UE hands over to a target base station, whether a source base station of the handover supports low complexity UE, and notify the paging capability transmitting unit if determining that the source base station does not support low complexity UE; and the paging capability transmitting unit is adapted to transmit obtained paging capability information of the UE to a Mobility Management Entity MME after being notified by the determining unit, wherein the paging capability information of the UE is used by the MME for paging the UE.

An apparatus for supporting paging of low complexity User Equipment UE, including: a detecting unit and a paging capability transmitting unit;

the detecting unit is adapted to notify the paging capability transmitting unit if not receiving paging capability information of the UE or information indicating that the paging capability information of the UE is transmitted to a Mobility Management Entity MME from the source base station during a handover of the UE from the source base station to the target base station; and the paging capability transmitting unit is adapted to transmit obtained paging capability information of the UE to the MME after being notified by the detecting unit, wherein the paging capability information of the UE is used by the MME for paging the UE.

An apparatus for supporting paging of low complexity User Equipment UE, including: a receiving unit and a paging capability transmitting unit;

the receiving unit is adapted to receive a UE paging capability required indication transmitted by a Mobility Management Entity MME, wherein the UE paging capability required indication is used for indicate a base station to report paging capability information of the UE to the MME; and the paging capability transmitting unit is adapted to transmit obtained paging capability information of the UE to the MME after the receiving unit receives the UE paging capability required indication, wherein the paging capability information of the UE is used by the MME for paging the UE.

An apparatus for supporting paging of low complexity User Equipment UE, including: a receiving and detecting unit and a paging capability transmitting unit;

the receiving and detecting unit is adapted to receive a predefined message transmitted by a Mobility Management Entity MME or a source base station, and notify the paging capability transmitting unit if not finding paging capability information of the UE in the predefined message; and the paging capability transmitting unit is adapted to transmit obtained paging capability information of the UE to the MME after being notified by the receiving and detecting unit, wherein the paging capability information of the UE is used by the MME for paging the UE.

An apparatus for supporting access of a low complexity User Equipment UE, including: an obtaining unit and a handover unit;

the obtaining unit is adapted to obtain information indicating whether an neighbor base station supports low complexity UE; and the handover unit is adapted to hand over the UE to an neighbor base station supporting low complexity UE when performing handover of the low complexity UE.

An apparatus for supporting access of a low complexity User Equipment UE, including: a receiving unit and a responding unit;

the receiving unit is adapted to receive from a source base station of the UE directly or via a Mobility Management Entity MME information indicating that the handover UE is a low complexity UE; and the responding unit is adapted to transmit directly or via the MME a handover failure message to the source base station if a target base station of handover does not support low complexity UE, and indicate that a failure reason is that the target base station does not support low complexity UE.

It can be seen from the above technical solution that, through the methods for supporting access and paging of low complexity UE provided by the embodiments of the present disclosure, it is avoided that the low complexity UE in the active mode accesses the base station not supporting low complexity UE and signaling procedures are reduced. It is possible to support paging enhancement of the low complexity UE under all scenarios, reduce modification to existing specifications and reduce signaling procedures.

Advantageous Effects of Invention

Embodiments of the present disclosure provide methods for supporting access and paging of a low complexity UE. According to the access method provided by an embodiment of the present disclosure, it is avoided that a low complexity UE in active mode accesses a base station not supporting low complexity UE, and signaling procedures are reduced. According to the paging method provided by an embodiment of the present disclosure, paging enhancement of the low complexity UE in all scenarios can be supported, modification to existing specifications is reduced and signaling procedures are reduced.

MODE FOR THE INVENTION

The present disclosure is described in further detail hereinafter with reference to accompanying drawings and embodiments to make the objective, technical solution and merits therein clearer.

In order to realize paging enhancement of low complexity UE, an embodiment of the present disclosure provides a method for supporting paging of a low complexity UE, which enables an MME to obtain paging capability information of the low complexity UE, thus the MME is able to transmit paging capability information of the low complexity UE to a base station, so as to facilitate the base station to page the UE.

In order to solve problems of poor quality of service and resource waste resulted from accessing a base station not supporting low complexity UE by the low complexity UE, an embodiment of the present disclosure provides a method for supporting access of low complexity UE, which enables the base station to obtain information indicating whether an neighbor base station supports low complexity UE or enables a target base station to obtain information of the low complexity UE, so as to avoid the low complexity UE accessing the base station which does not support the low complexity UE.

Hereinafter the methods for supporting paging and access of lower-complexity UE are described. For facilitating the description, implementation of the embodiments of the present disclosure is described by way of interactions between entities.

In the embodiments of the present disclosure, paging capability information of the UE refers to information which indicates that the UE is a low complexity UE, or relevant information indicating that the UE belongs to category 0, or may further include other information.

Figure 1:
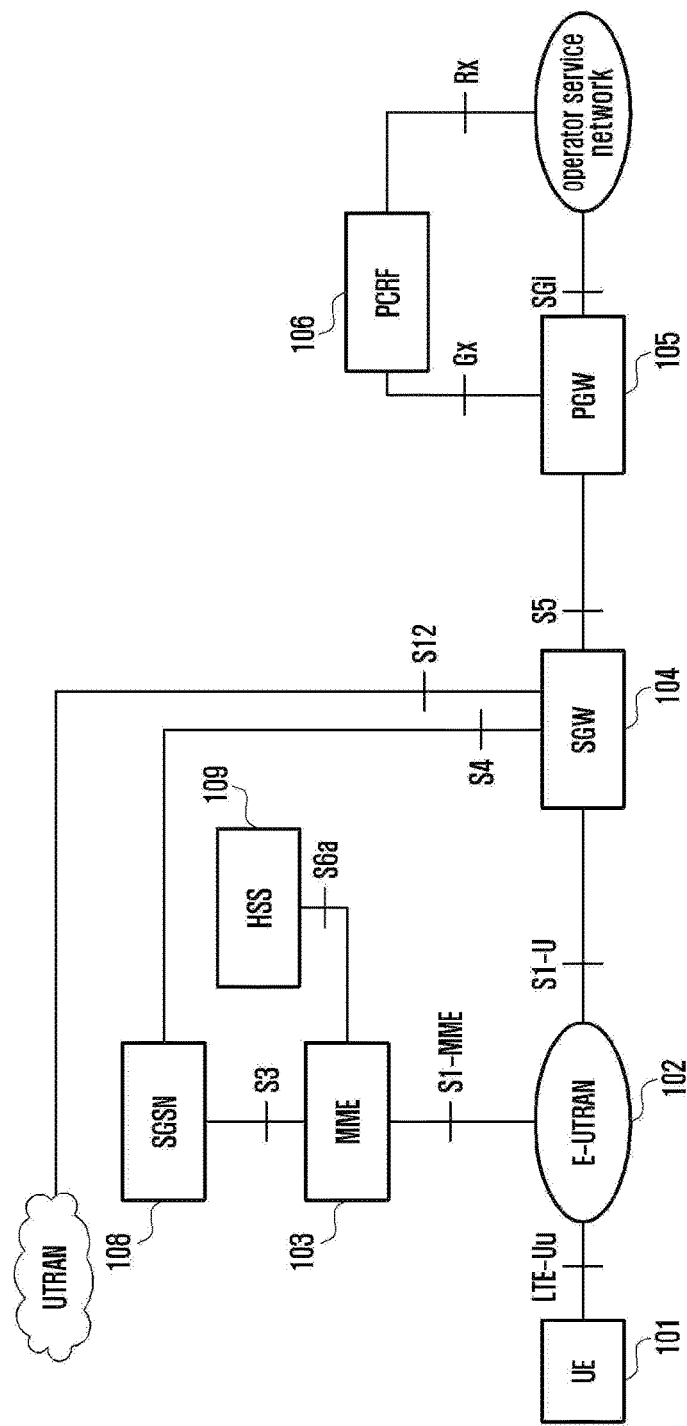
FIG. 1 shows an SAE system architecture according to the prior art.
Figure 2:
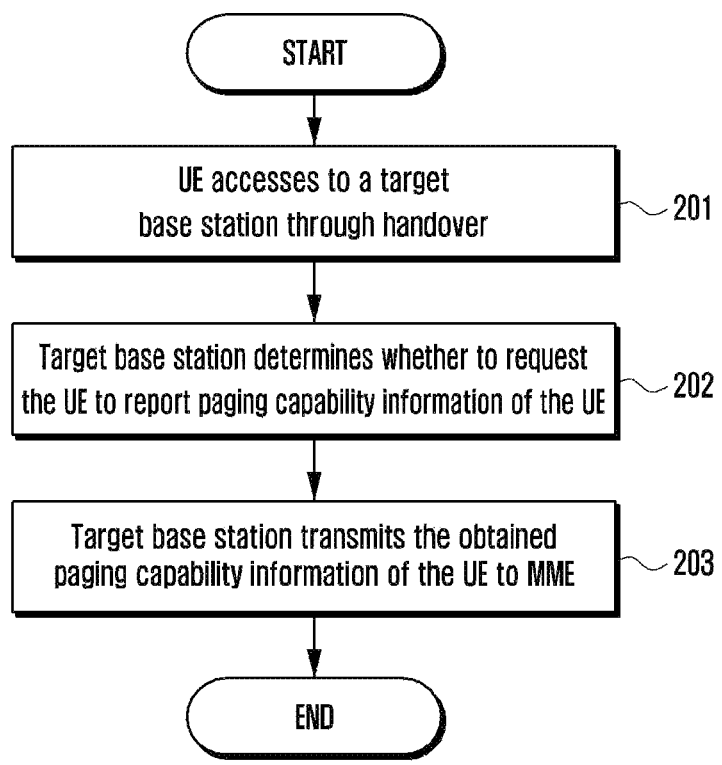
FIG. 2 is a schematic diagram illustrating a first method for supporting paging of low complexity UE according to an embodiment of the present disclosure.

FIG. 2 is schematic diagram illustrating a first method for supporting paging of low complexity UE according to an embodiment of the present disclosure. In this method, a target base station determines whether to request the UE to report paging capability according to version of a source base station or supporting capability of the source base station to the low complexity UE. If needed, the target base station requests the UE to report the paging capability. The target base station transmits the paging capability obtained from the UE to an MME. Through this method, paging capability information of the UE is not required to be transmitted during handover, which avoids influence to existing handover, reduces information transmission, and enables the MME to obtain the required paging capability information of the UE in time.

At block 201, the UE accesses the target base station via handover.

After the handover, the target base station becomes a serving base station of the UE. In this block, the UE may accesses the target base station via an X2 handover or an S1 handover. The base station mentioned hereinafter refers to the target base station serving the UE.

At block 202, the base station determines whether to request the UE to report its paging capability.

The base station determines whether to request the UE to report the paging capability information of the UE according to whether the source base station supports low complexity UE. If the source base station supports low complexity UE, the base station does not need to request the paging capability information of the UE. The base station regards that the source base station has already obtained the paging capability information of the UE and transmitted it to the MME. Therefore the MME has already had the paging capability information of the UE. If the source base station does not support low complexity UE, the base station may request the paging capability information of the UE since the MME may not have the paging capability information of the UE.

The base station may know whether the source base station supports low complexity UE via following manners:

In a first manner, the base station may know whether an neighbor base station supports low complexity UE via operating and maintaining Q&M configurations.

In a second manner, the base station may obtain information indicating whether the neighbor base station supports low complexity UE via an X2 setup procedure. A detailed obtaining method for this manner may include: base station 1 transmits an X2 setup request message to base station 2, wherein the message carries information indicating whether base station 1 supports low complexity UE. The information indicating whether low complexity UE is supported may be carried via various methods. For example, the message may include indication information indicating supporting of low complexity UE, denoting that base station 1 supports low complexity UE. Absence of this indication information in the message denotes that base station 1 does not support low complexity UE. Thereafter, base station 2 transmits an X2 setup response message to base station 1, wherein the message carries information indicating whether base station 2 supports low complexity UE. The information indicating whether low complexity UE is supported may be carried via various methods. For example, the message may include indication information indicating supporting of low complexity UE, denoting that base station 2 supports low complexity UE. Absence of this indication information in the message denotes that base station 2 does not support low complexity UE. Thus, two neighbor base stations may obtain information indicating whether the other supports low complexity UE.

In a third manner, the base station transmits information indicating it supports low complexity UE to its neighbor via an S1 interface, e.g., via eNB configuration transfer and MME configuration transfer.

In a fourth manner, the base station obtains information indicating whether the source base station supports low complexity UE from the UE. The detailed obtaining process may include the following:

Base station 1 broadcasts information indicating whether it supports low complexity UE;

a UE served by base station 2 reads broadcast information of base station 1 and obtains information indicating whether base station 1 supports low complexity UE; and the UE reports the information indicating whether base station 1 supports low complexity UE to base station 2.

In the above fourth manner, before the UE reads the broadcast information of base station 1, a following step may be further included: base station 2 requests a UE served by it to report information indicating whether base station 1 support low complexity UE. Then, the UE reads the broadcast information of base station 1 and reports to base station 2. Corresponding to this embodiment, base station 1 is a source base station and base station 2 is a target base station. The UE is served by the target base station.

If determining that the source base station does not support low complexity UE via one of the above manners, the base station needs to transmit the paging capability information of the UE to the MME via block 203. Before this block, if the base station does not obtain the paging capability information of the UE, the base station needs to transmit a UE capability enquiry message to the UE, requesting the paging capability information of the UE. After receiving the UE capability enquiry message, the UE transmits UE capability information to the base station. The UE capability information includes the paging capability information of the UE. The paging capability information of the UE may include UE belongs to cat-0, or further include other information, which does not affect contents of the embodiment of the present disclosure.

At block 203, the base station transmits the obtained paging capability information of the UE to the MME.

The base station may transmit the paging capability information of the UE to the MME via a UE capability information indication or a path switch request or a handover request acknowledgment or a handover notify or other S1 messages.

When the MME needs to page the UE, if the MME UE context includes the paging capability information of the UE, the MME includes the paging capability information of the UE in a paging message transmitted to the base station. When paging the UE, the base station refers to the paging capability information of the UE received from the MME.

Figure 3:
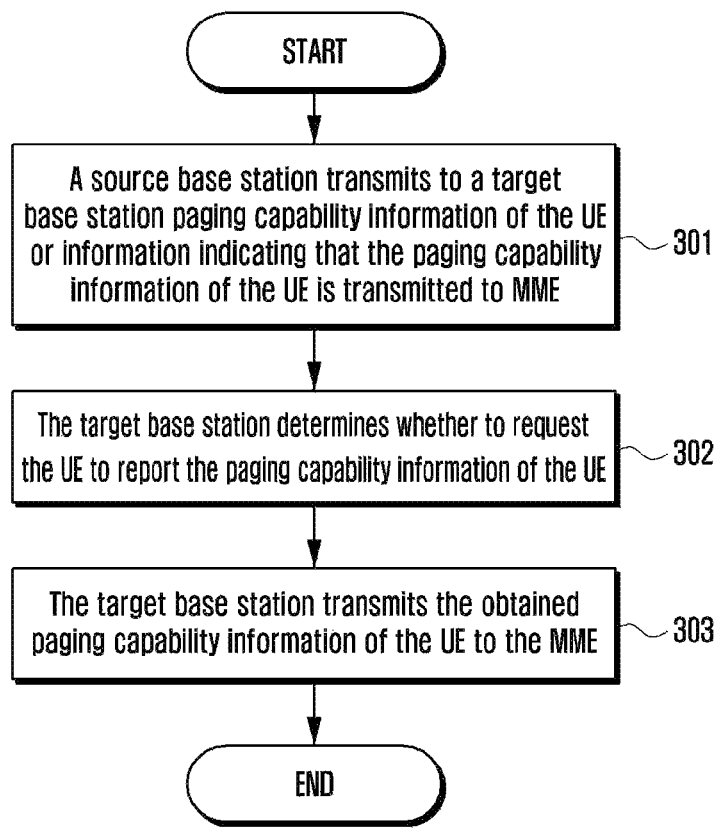
FIG. 3 is a schematic diagram illustrating a second method for supporting paging of low complexity UE according to an embodiment of the present disclosure.

FIG. 3 is a schematic diagram illustrating a second method for supporting paging of low complexity UE according to an embodiment of the present disclosure. In this method, paging capability information of the UE or indication of whether the paging capability information of the UE has been transmitted to the MME is transmitted to the target base station via a handover message. The target base station determines whether to request the UE to report the paging capability. If yes, the target base station requests the UE to report the paging capability and transmits the paging capability obtained from the UE to the MME. Through this method, the target base station may determine whether the MME has the paging capability information of the UE during handover procedure. If the MME has already had, the target base station does not need to obtain such information from the UE, which reduces air interface signaling transmission. If the MME does not have, the target base station is able to request the UE to report the paging capability information in time, such that the MME may obtain the paging capability information of the UE in time.

At block 301, the UE accesses the target base station via handover.

The source base station transmits to the target base station the paging capability information of the UE or the indication of whether the paging capability information of the UE is transmitted to the MME. In this block, the UE may access the target base station via an X2 handover or an S1 handover. The source base station may transmit the information to the target base station via a handover request message in the X2 handover procedure or a handover required and handover request message in the S1 handover procedure.

At block 302, the target base station determines whether to request the UE to report the paging capability information of the UE.

If the target base station receives the paging capability information of the UE or the indication that the paging capability is transmitted to the MME from the source base station, the target base station regards that the MME has already obtained the paging capability information of the UE from the source base station or another base station.

If the target base station does not receive the paging capability information of the UE or the indication that the paging capability information of the UE is transmitted to the MME from the source base station, the target base station may request the paging capability information of the UE since the MME may not have the paging capability information of the UE.

The target base station may request the paging capability information of the UE in a following manner the target base station transmits a UE capability enquiry message to the UE, requesting the paging capability information of the UE; and the UE transmits UE capability information to the target base station. The UE capability information may include the paging capability information of the UE. The paging capability information of the UE may be UE belongs to category 0, and may further include other information which does not affect contents of the embodiment of the present disclosure.

Block 303 is the same as block 203 and is not repeated herein.

Hereinafter the implementation of the second method is described with reference to two embodiments.

Figure 4:
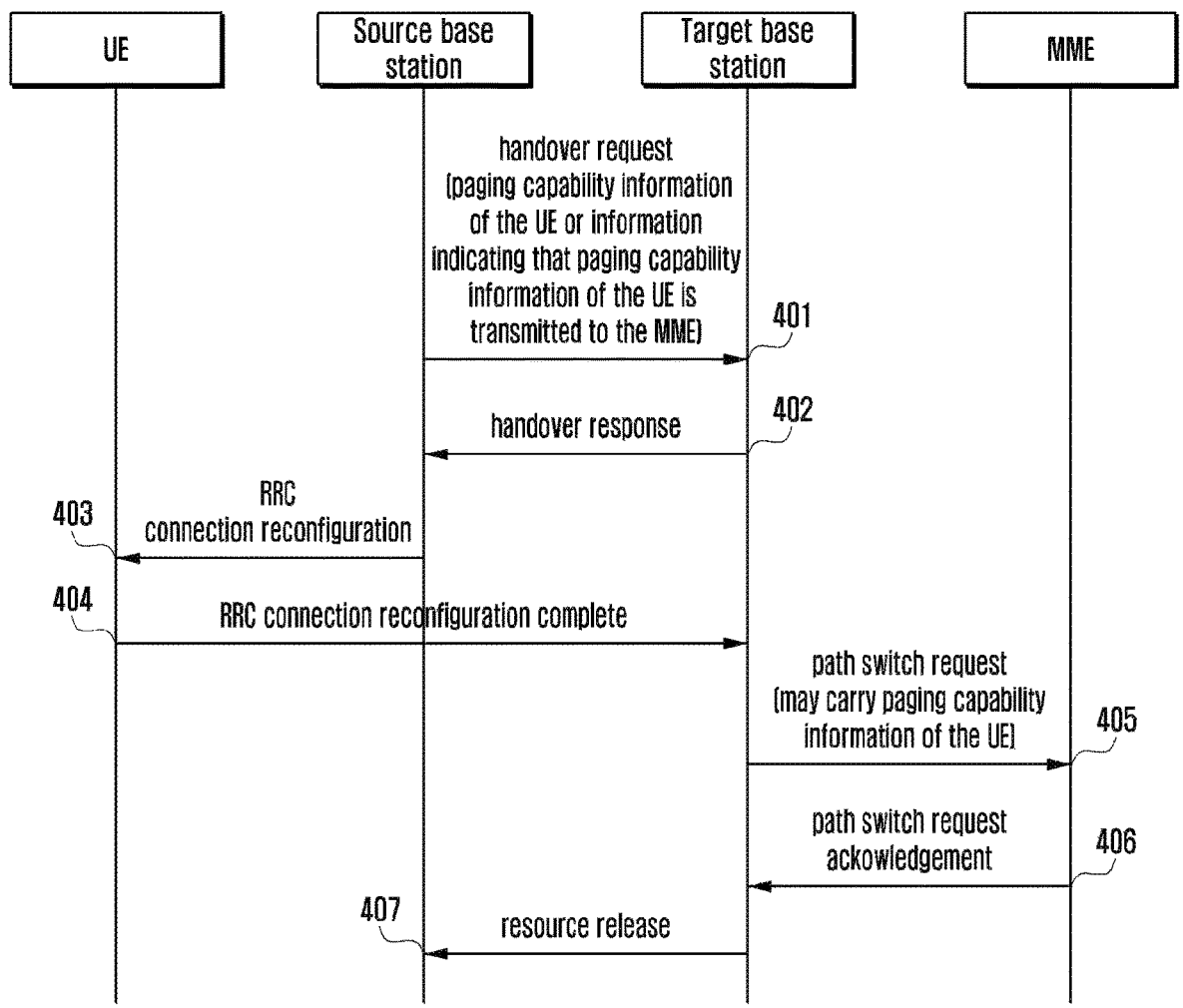
FIG. 4 is a schematic diagram illustrating a first embodiment of the second method for supporting paging of low complexity UE according to the present disclosure.

FIG. 4 shows a first embodiment of the second method for supporting paging of low complexity UE according to the present disclosure. This embodiment describes a procedure that the target base station determines whether to request the paging capability information of the UE after the UE accesses the target base station via an X2 handover. Herein operations irrelevant to the embodiment of the present disclosure are omitted.

At block 401, a source base station transmits a handover request message to the target base station, wherein the message may include the paging capability information of the UE or include information indicating that the paging capability information of the UE is transmitted to the MME. The target base station saves the received information.

At block 402, the target base station transmits a handover response message to the source base station.

At block 403, the source base station transmits an RRC connection reconfiguration message to the UE.

At block 404, the UE transmits an RRC connection reconfiguration complete message to the target base station.

At block 405, the target base station transmits a path switch request message to the MME.

At block 406, the MME transmits a path switch request acknowledgement message to the target base station.

At block 407, the target base station transmits a resource release message to the source base station.

The target base station determines whether to request the UE to report the paging capability information of the UE according to the information received in block 401.

If the target base station receives the paging capability information of the UE or receives the information indicating that the paging capability information of the UE is transmitted to the MME from the source base station, the target base station regards that the MME has already obtained the paging capability information of the UE from the source base station or another base station.

If the target base station does not receive the paging capability information of the UE or the information indicating that the paging capability information of the UE is transmitted to the MME from the source base station, the target base station may request the paging capability information of the UE. In one embodiment, the target base station may transmit a UE capability enquiry request to the UE, requesting the paging capability information of the UE; and the UE transmits the UE capability information to the target base station. The UE capability information includes the paging capability information of the UE. The paging capability information of the UE may be UE belongs to category 0, or may further include other information which does not affect content of the embodiment of the present disclosure.

The process that the target base station determines whether to request the UE to report the paging capability information of the UE and the requesting procedure may be performed after block 404 or at any stage after the handover is completed.

The target base station transmits the obtained paging capability information of the UE to the MME. The target base station may transmit the paging capability information of the UE to the MME via a UE capability information indication or a path switch request or other existing S1 messages or a self-defined S1 message. In the case that the target base station transmits the paging capability information of the UE to the MME via the path switch request, if the target base station does not have the paging capability information of the UE, the target base station needs to request the paging capability information of the UE before transmitting the path switch request.

When the MME needs to page the UE, if the MME UE context includes the paging capability information of the UE, the MME includes the paging capability information of the UE in the paging message transmitted to the base station. When paging the UE, the base station refers to the paging capability information of the UE received from the MME.

Figure 5:
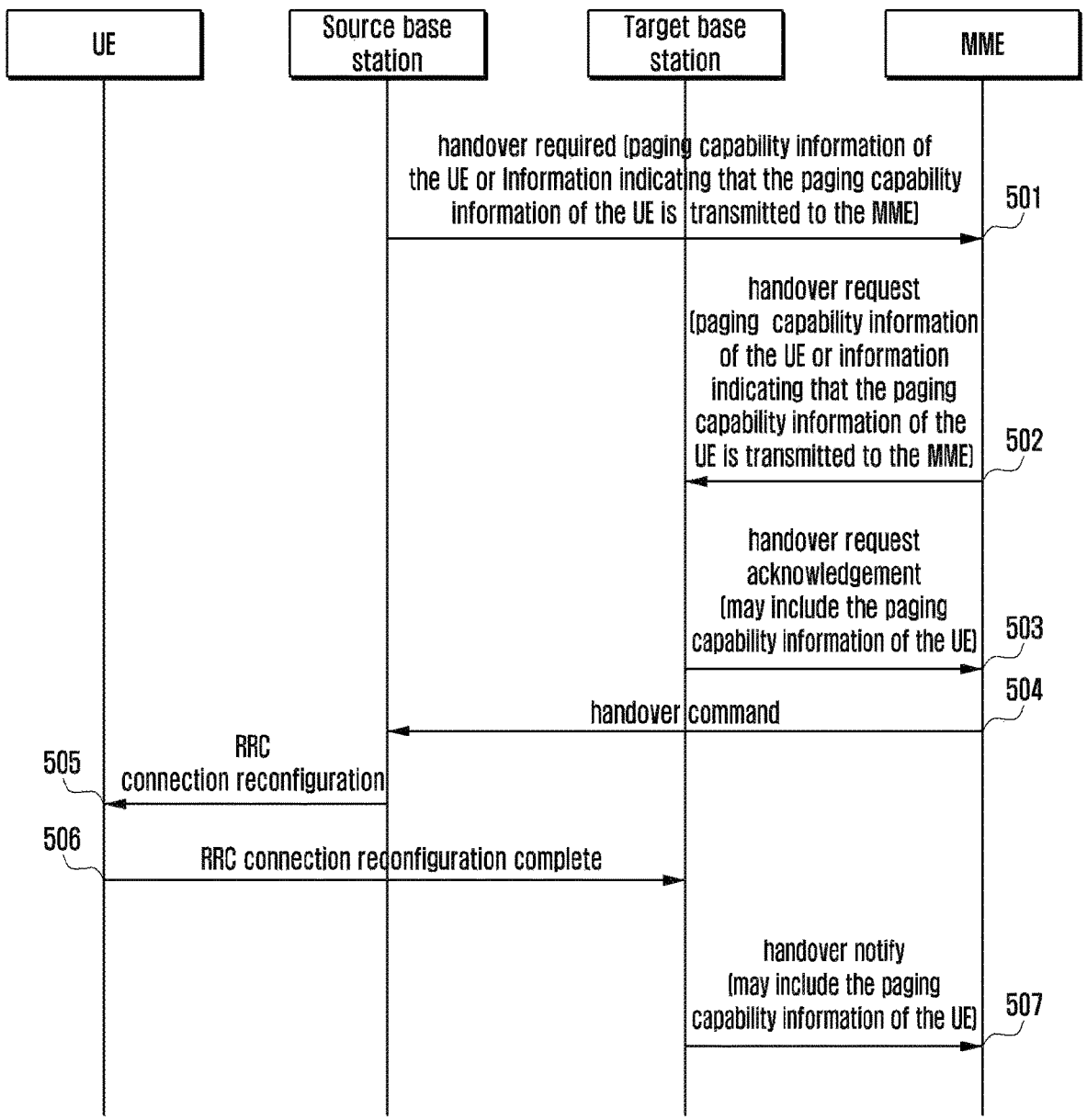
FIG. 5 is a schematic diagram illustrating a second embodiment of the second method for supporting paging of low complexity UE according to the present disclosure.

FIG. 5 shows a second embodiment of the second method for supporting paging of the low complexity UE according to the present disclosure. This embodiment describes a procedure that the target base station determines whether to request the paging capability information of the UE after the UE accesses the target base station via an S1 handover. Herein operations irrelevant to the embodiment of the present disclosure are omitted.

At block 501, a source base station transmits a handover required message to the MME. The message may include the paging capability information of the UE or include information indicating that the paging capability information of the UE is transmitted to the MME. The information may be included in a transparent container from the source base station to the target base station or included in the message directly.

At block 502, the MME transmits a handover request message to the target base station. The message may include the paging capability information of the UE or include information indicating that the paging capability information of the UE is transmitted to the MME. The information may be included in a transparent container from the source base station to the target base station or included in the message directly.

The target base station saves the received information.

At block 503, the target base station transmits a handover request acknowledgement message to the MME.

At block 504, the MME transmits a handover command message to the source base station.

At block 505, the source base station transmits an RRC connection reconfiguration message to the UE.

At block 506, the UE transmits an RRC connection reconfiguration complete message to the target base station.

At block 507, the target base station transmits a handover notify message to the MME.

The target base station determines whether to request the UE to report the paging capability information of the UE according to the information received in block 502.

If the target base station receives the paging capability information of the UE or receives the information indicating that the paging capability information of the UE is transmitted to the MME, the target base station regards that the MME has obtained the paging capability information of the UE from the source base station or another base station.

If the target base station does not receive the paging capability information of the UE or the information indicating that the paging capability information of the UE is transmitted to the MME, the target base station may request the paging capability information of the UE. In one embodiment, the target base station may transmit a UE capability enquiry message to the UE, requesting the paging capability information of the UE; and the UE transmits the UE capability information to the target base station. The UE capability information includes the paging capability information of the UE. The paging capability information of the UE may be UE belongs to category 0, or may further include other information which does not affect contents of the embodiment of the present disclosure.

The process that the target base station determines whether to request the UE to report the paging capability information of the UE and the requesting procedure may be performed after block 506 or at any stage after the handover is completed.

The target base station transmits the obtained paging capability information of the UE to the MME. The target base station may transmit the paging capability information of the UE to the MME via a UE capability information indication or a path switch request acknowledgement or a handover notify or other existing S1 messages or a self-defined S1 message. In the case that the target base station transmits the paging capability information of the UE to the MME via the handover notify, if the target base station does not have the paging capability information of the UE, the target base station needs to request the paging capability information of the UE before this block.

When the MME needs to page the UE, if the MME UE context includes the paging capability information of the UE, the MME includes the paging capability information of the UE in the paging message transmitted to the base station. When paging the UE, the base station refers to the paging capability information of the UE received from the MME.

Figure 6:
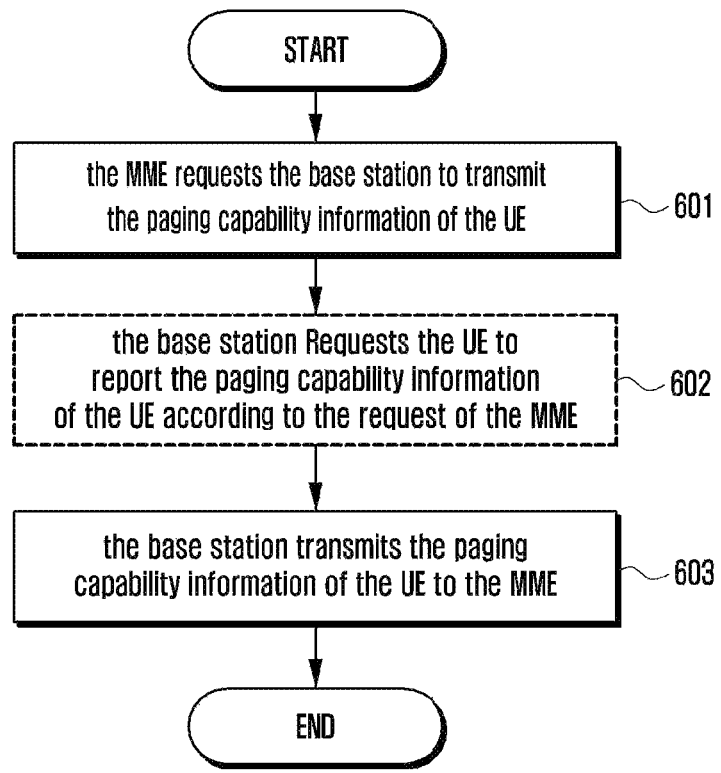
FIG. 6 is a schematic diagram illustrating a third method for supporting paging of low complexity UE according to an embodiment of the present disclosure.

FIG. 6 is a schematic diagram illustrating a third method for supporting paging of low complexity UE according to an embodiment of the present disclosure. In this method, only when indicated by the MME, the base station reports the paging capability information of the UE. In other situations, the base station does not need to transmit the paging capability information of the UE to the MME. Through this method, the paging capability information may be reported to the MME when the UE first time accesses the MME supporting low complexity UE via the base station supporting low complexity UE. In other situations, no reporting is required, which reduces information transmission and the MME is able to obtain the required paging capability information of the UE in time.

At block 601, the MME requests the base station to transmit the paging capability information of the UE.

At block 602, the base station obtains the paging capability information of the UE according to the request of the MME.

If the base station does not have the paging capability information of the UE, the base station transmits a UE capability enquiry message to the UE, requesting the paging capability information of the UE; and the UE transmits the UE capability information to the base station. The UE capability information may include the paging capability information of the UE. The paging capability information of the UE may be UE belongs to category 0, and may further include other information which does not affect contents of the embodiment of the present disclosure.

At block 603, the base station transmits the paging capability information of the UE to the MME. The base station may transmits the capability information of the UE to the MME via a UE capability information indication or a handover request acknowledgement or a handover notify or an initial context setup response or other existing S1 messages or a self-defined S1 message.

When the MME needs to page the UE, if the MME UE context includes the paging capability information of the UE, the MME includes the paging capability information of the UE in the paging message transmitted to the base station. When paging the UE, the base station refers to the paging capability information of the UE received from the MME.

Hereinafter the implementation of the third method is described with reference to three embodiments under different scenarios.

Figure 7:
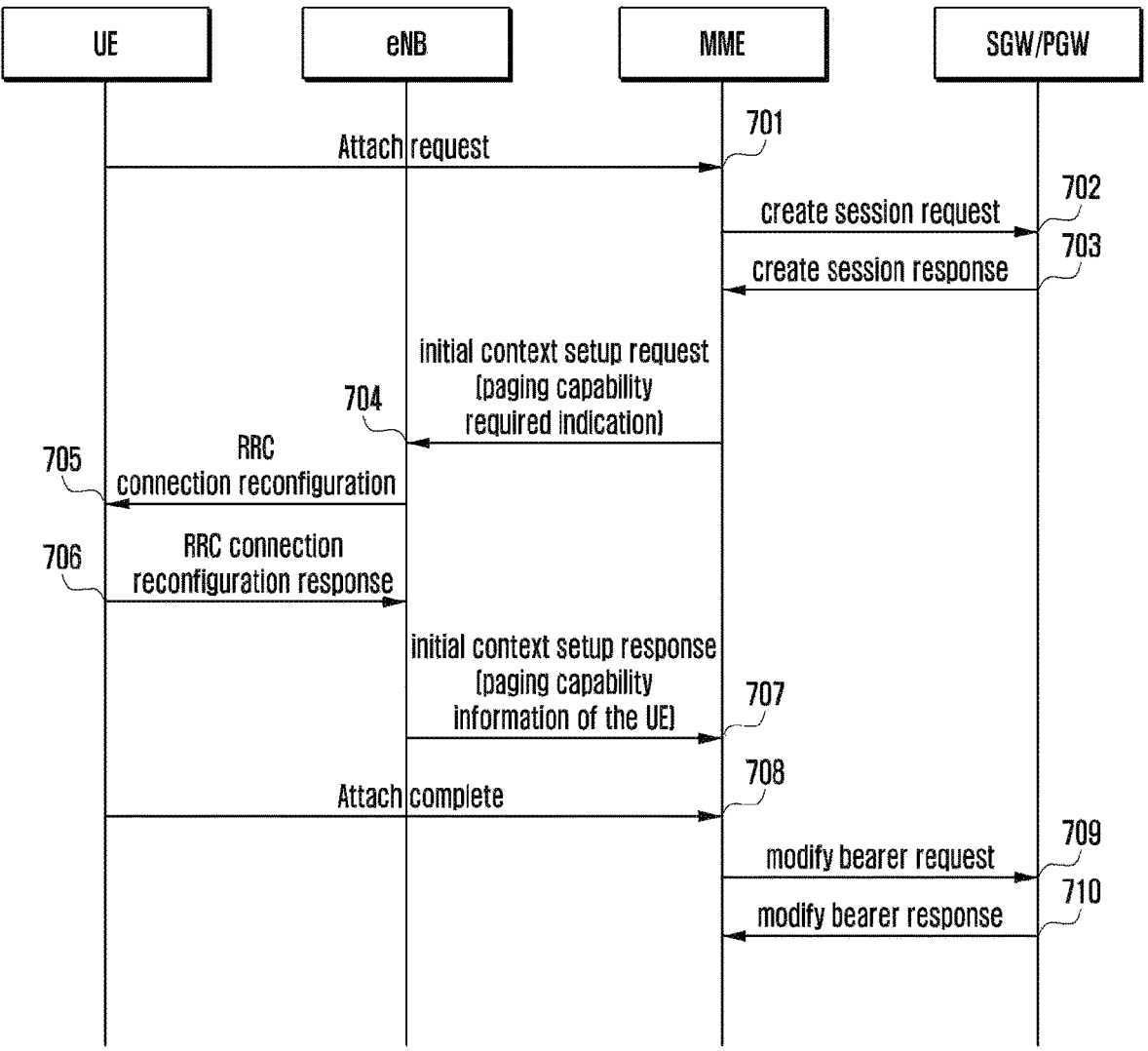
FIG. 7 is a schematic diagram illustrating a first embodiment of the third method for supporting paging of low complexity UE according to the present disclosure.

FIG. 7 is a schematic diagram illustrating a first embodiment of the third method for supporting paging of low complexity UE according to the present disclosure. In this embodiment, the UE accesses the base station when changing from an idle state to an active state, i.e., the base station that the UE accesses when changing from the idle state to the active state is the base station as shown in FIG. 6.

At block 701, the UE transmits a non-access layer NAS message, e.g., an Attach request to the MME.

At block 702, the MME transmits a create session request message to the SGW/PGW.

At block 703, the SGW/PGW transmits a create session response message to the MME.

At block 704, the MME transmits an initial context setup request message to the base station. If the MME supports low complexity UE and the MME does not have the paging capability information of the UE, the MME may request via the initial context setup request message the base station to report the paging capability information of the UE. The MME may include a paging capability required indication in the initial context setup request message to indicate the base station to report the paging capability information of the UE.

At block 705, the base station transmits an RRC connection reconfiguration message to the UE.

At block 706, the UE transmits an RRC connection reconfiguration response message to the base station.

At block 707, the base station transmits an initial context setup response message to the MME.

If the base station receives the indication requesting the base station to report the paging capability information of the UE and the base station has the paging capability information of the UE, the base station transmits the paging capability information of the UE to the MME. There may be two manners for the base station to transmit the paging capability information of the UE to the MME. In a first manner, the base station transmits the paging capability information of the UE to the MME via the initial context setup response. In a second manner, the base station transmits the paging capability information of the UE to the MME via a UE capability indication message.

If the base station does not have the paging capability information of the UE, the base station transmits a UE capability enquiry request to the UE, requesting the paging capability information of the UE; and the UE transmits the UE capability information to the base station. The UE capability information may include the paging capability information of the UE. The paging capability information of the UE may be UE belongs to category 0, or may further include other information which does not affect the content of the embodiment of the present disclosure. After obtaining the paging capability information of the UE, the base station may transmit the paging capability information of the UE to the MME via a similar manner as described above. In the case that the base station transmits the paging capability information of the UE to the MME via the initial context setup response, the base station needs to request the paging capability information of the UE before block 707.

When the MME needs to page the UE, if the MME UE context includes the paging capability information of the UE, the MME includes the paging capability information of the UE in the paging message transmitted to the base station. When paging the UE, the base station refers to the paging capability information of the UE received from the MME.

At block 708, the UE transmits an NAS message such as attach complete to the MME.

At block 709, the MME transmits a modify bearer request message to the SGW/PGW.

At block 710, the SGW/PGW transmits a modify bearer response to the MME.

Figure 8:
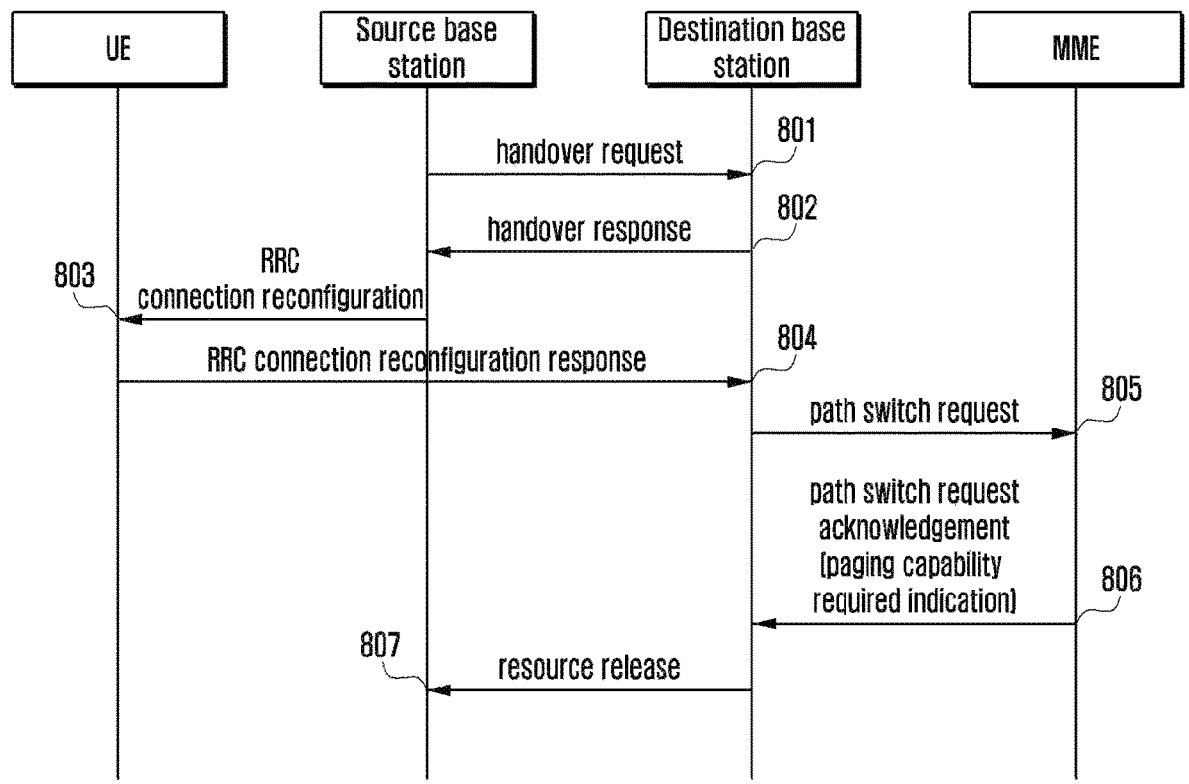
FIG. 8 is a schematic diagram illustrating a second embodiment of the third method for supporting paging of low complexity UE according to the present disclosure.

FIG. 8 is a schematic diagram illustrating a second embodiment of the third method for supporting paging of low complexity UE according to the present disclosure. In this embodiment, the UE accesses a target base station from a source base station via an X2 handover, wherein the target base station is the base station as shown in FIG. 6.

At block 801, the source base station transmits a handover request message to the target base station.

At block 802, the target base station transmits a handover response message to the source base station.

At block 803, the source base station transmits an RRC connection reconfiguration message to the UE.

At block 804, the UE transmits an RRC connection reconfiguration complete message to the target base station.

At block 805, the target base station transmits a path switch request message to the MME.

At block 806, the MME transmits a path switch request acknowledgement message to the target base station. If the MME supports low complexity UE and the MME does not have the paging capability information of the UE, the MME may request via a path switch request acknowledgement message the target base station to report the paging capability information of the UE. The MME may include a paging capability required indication in the path switch request acknowledgement message to indicate the target base station to report the paging capability information of the UE.

If the target base station receives the paging capability information of the UE from the source base station, the target base station transmits the paging capability information of the UE to the MME. The target base station transmits the paging capability information of the UE to the MME via a UE capability indication message.

If the target base station does not have the paging capability information of the UE, the target base station transmits a UE capability enquiry request to the UE, requesting the paging capability information of the UE; and the UE transmits the UE capability information to the target base station. The UE capability information may include the paging capability information of the UE. The paging capability information of the UE may be UE belongs to category 0, or may further include other information which does not affect the content of the embodiment of the present disclosure. The target base station may transmit the paging capability information of the UE to the MME. In one embodiment, the target base station may transmit the paging capability information of the UE to the MME via a UE capability indication message.

When the MME needs to page the UE, if the MME UE context includes the paging capability information of the UE, the MME puts the paging capability information of the UE in the paging message transmitted to the base station. When paging the UE, the base station refers to the paging capability information of the UE received from the MME.

At block 807, the target base station transmits a resource release message to the source base station.

Figure 9:
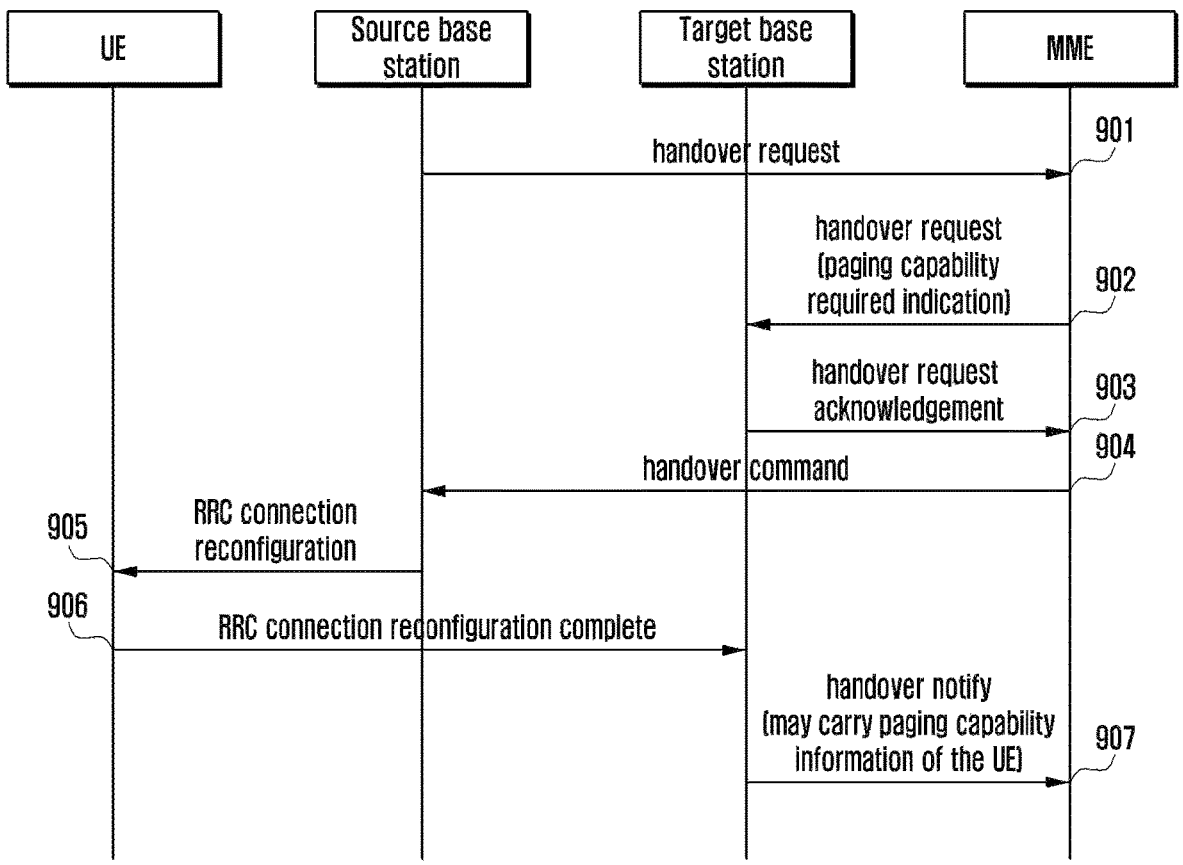
FIG. 9 is a schematic diagram illustrating a third embodiment of the third method for supporting paging of low complexity UE according to the present disclosure.

FIG. 9 is a schematic diagram illustrating a third embodiment of the third method for supporting low complexity UE according to the present disclosure. In this embodiment, the UE accesses the target base station from a source base station via an S1 handover, wherein the target base station is the serving base station as shown in FIG. 6. The S1 handover in this embodiment may be an S1 handover between different MMEs or an S1 handover under the same MME. For the S1 handover between different MMEs, the embodiment of the present disclosure does not focus on operations between the MMEs and therefore description of such operations are omitted.

At block 901, the source base station transmits a handover required message to the MME.

At block 902, the MME transmits a handover request message to the target base station. If the MME supports low complexity UE and the MME does not have the paging capability information of the UE, the MME may request, via the handover request message, the target base station to report the paging capability information of the UE. The MME may include a paging capability required indication in the handover request message to indicate the target base station to report the paging capability information of the UE.

If the target base station receives the paging capability information of the UE from the source base station, the target base station transmits the paging capability information of the UE to the MME. In this embodiment, the target base station may transmit the paging capability information of the UE to the MME via four manners. In a first manner, the target base station transmits the paging capability information of the UE to the MME via a handover request acknowledgement. In a second manner, the target base station transmits the paging capability information of the UE to the MME via a handover notify. In a third manner, the target base station transmits the paging capability information of the UE to the MME via a UE capability indication message. In a fourth manner, the target base station transmits the paging capability information of the UE to the MME via another S1 message.

If the target base station does not have the paging capability information of the UE, the target base station transmits a UE capability enquiry request to the UE, requesting the paging capability information of the UE; and the UE transmits the UE capability information to the target base station. The UE capability information may include the paging capability information of the UE. The paging capability information of the UE may be UE belongs to category 0, or may further include other information which does not affect the content of the embodiment of the present disclosure. After obtaining the paging capability information of the UE, the target base station may transmit the paging capability information of the UE to the MME. In the case that the target base station transmits the paging capability information of the UE to the MME via the handover notify, the target base station needs to request the paging capability information of the UE before block 907.

When the MME needs to page the UE, if the MME UE context includes the paging capability information of the UE, the MME includes the paging capability information of the UE in the paging message transmitted to the target base station. When paging the UE, the target base station refers to the paging capability information of the UE received from the MME.

At block 903, the target base station transmits a handover request acknowledgement message to the MME.

At block 904, the MME transmits a handover command message to the source base station.

At block 905, the source base station transmits an RRC connection reconfiguration message to the UE.

At block 906, the UE transmits an RRC connection reconfiguration complete message to the target base station.

At block 907, the target base station transmits a handover notify message to the MME.

Figure 10:
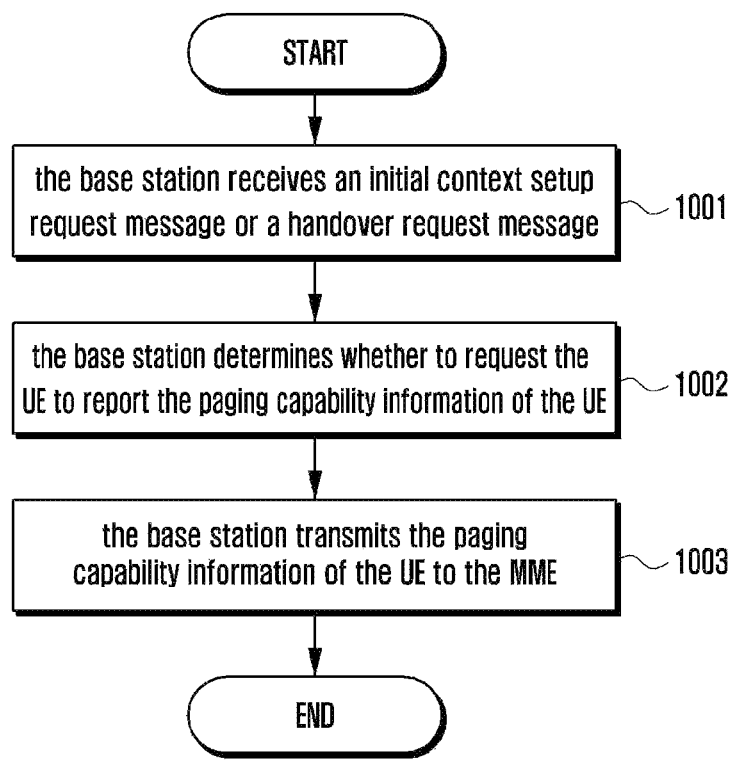
FIG. 10 is a schematic diagram illustrating a fourth method for supporting paging of low complexity UE according to the present disclosure.

FIG. 10 is a schematic diagram illustrating a fourth method for supporting paging of low complexity UE according to an embodiment of the present disclosure. In this method, only if the target base station does not receive the paging capability information of the UE from the MME or the source base station, the target base station transmits the paging capability information of the UE to the MME. In other situations, the base station does not need to transmit the paging capability information of the UE to the MME. This method has the least modification to existing specifications and supports paging to low complexity UE.

At block 1001, the base station receives an initial context setup request message or a handover request message.

The handover request message may be an X2 handover request message or an S1 handover request message. The base station in this method may be a base station that the UE accesses when changing from an idle state to an active state or a target base station during a handover procedure.

The UE radio capability information in the above existing message may include information indicating that the UE belongs to category 0.

In accordance with this method, if the MME supports low complexity UE and saves the paging capability information of the UE, the MME needs to include the paging capability information of the UE in the initial context setup request message or the S1 handover request message. For the handover procedure, if the source base station supports low complexity UE and saves the paging capability information of the UE, the source base station needs to include the paging capability information of the UE in the X2 handover request or the S1 handover required message.

At block 1002, the base station determines whether to request the UE to report the paging capability information of the UE.

If the message received in block 1001 does not include the paging capability information of the UE and the base station does not have the paging capability information of the UE, the base station requests the UE to report the paging capability information of the UE. The base station transmits a UE capability enquiry request to the UE, requesting the paging capability information of the UE; and the UE transmits the UE capability information to the base station. The UE capability information includes the paging capability information of the UE. The paging capability information of the UE may include UE belongs to cat-0 or may further include other information which does not affect the contents of the embodiment of the present disclosure.

At block 1003, if not receiving the paging capability information of the UE in block 1001, the base station transmits the paging capability information of the UE to the MME.

In this method, there may be three manners for the base station to transmit the paging capability information of the UE to the MME. In a first manner, the base station transmits the paging capability information of the UE to the MME via an initial context setup response. In a second manner, the base station transmits the paging capability information of the UE to the MME via a UE capability indication message. In a third manner, the base station transmits the paging capability information of the UE to the MME via a handover request acknowledgment or a handover notify message or another existing S1 message or a self-defined S1 message.

When the MME needs to page the UE, if the MME UE context includes the paging capability information of the UE, the MME includes the paging capability information of the UE in the paging message transmitted to the base station. When paging the UE, the base station refers to the paging capability information of the UE received from the MME.

The above describes four implementation methods for supporting paging of low complexity UE provided by an embodiment of the present disclosure. An embodiment of the present disclosure further provides an apparatus for supporting paging of low complexity UE, applicable for implementing the above method for supporting paging of low complexity UE.

A first apparatus for supporting paging of low complexity UE provided by an embodiment of the present disclosure includes: a determining unit and a paging capability transmitting unit. The determining unit is adapted to determine, after a UE hands over to a target base station, whether a source base station supports low complexity UE, and notify the paging capability transmitting unit if determining that the source base station does not support low complexity UE. The paging capability transmitting unit is adapted to transmit, after being notified by the determining unit, the obtained paging capability information of the UE to the MME, wherein the paging capability information of the UE is used by the MME for paging the UE. The apparatus may implement the first method for supporting paging of low complexity UE as shown in FIG. 2.

A second apparatus for supporting paging of low complexity UE provided by an embodiment of the present disclosure includes: a detecting unit and a paging capability transmitting unit. The detecting unit is adapted to notify the paging capability transmitting unit if not receiving paging capability information of the UE or information indicating paging capability information of the UE is transmitted to the MME from the source base station during handover of the UE from the source base station to the target base station. The paging capability transmitting unit is adapted to transmit the obtained paging capability information of the UE to the MME after being notified by the detecting unit, wherein the paging capability information of the UE is used by the MME for paging the low complexity UE. This apparatus may be used for implementing the second method for supporting paging of low complexity UE as shown in FIG. 3.

A third apparatus for supporting paging of low complexity UE provided by an embodiment of the present disclosure includes: a receiving unit and a paging capability transmitting unit. The receiving unit is adapted to receive a UE paging capability required indication transmitted by the MME. The paging capability transmitting unit is adapted to transmit obtained paging capability information of the UE to the MME after the receiving unit receives the UE paging capability required indication, wherein the paging capability information of the UE is used by the MME for paging the low complexity UE. The UE paging capability required indication is used for notifying the base station to report the paging capability information of the UE. This apparatus may be used for implementing the third method for supporting paging of low complexity UE as shown in FIG. 6.

A fourth apparatus for supporting paging of low complexity UE provided by an embodiment of the present disclosure includes: a receiving and detecting unit and a paging capability transmitting unit. The receiving and detecting unit is adapted to receive a predefined message transmitted by the MME or the source base station of the handover, and notify the paging capability transmitting unit if not finding paging capability information of the UE in the predefined message. The paging capability transmitting unit is adapted to transmit the obtained paging capability information of the UE to the MME after being notified by the receiving and detecting unit, wherein the paging capability information of the UE is used by the MME for paging the low complexity UE. This apparatus may be used for implementing the fourth method for supporting paging of low complexity UE as shown in FIG. 10.

Hereinafter two methods for supporting access of low complexity UE provided by embodiments of the present disclosure are described.

Figure 11:
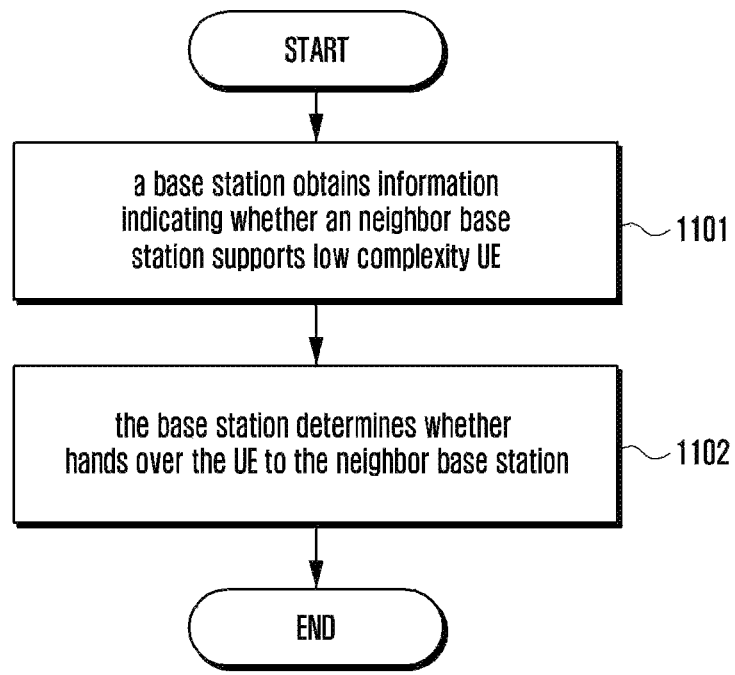
FIG. 11 is a schematic diagram illustrating a first method for supporting access of low complexity UE according to an embodiment of the present disclosure.

FIG. 11 is a schematic diagram illustrating a first method for supporting access of low complexity UE according to an embodiment of the present disclosure. As shown in FIG. 11, the method includes the following.

At block 1101, a base station obtains information indicating whether a neighbor base station supports low complexity UE.

The base station may obtain the information indicating whether the neighbor base station supports low complexity UE via following manners.

In a first manner, the base station knows whether the neighbor base station supports low complexity UE via the UE, which includes:

Base station 1 broadcasts whether it supports low complexity UE;

a UE served by base station 2 reads broadcast information of base station 1 and obtains information indicating whether base station 1 supports low complexity UE; and the UE reports to base station 2 whether base station 1 supports low complexity UE.

In the above processing, before the UE reads the broadcast information of base station 1, a following step may be further included: base station 2 requests a UE served by base station 2 to report information indicating whether base station 1 supports low complexity UE. Then the UE reads the broadcast information of base station 1 and reports to base station 2.

In a second manner, the base station knows whether the neighbor base station supports low complexity UE via an X2 setup procedure, which includes:

Base station 1 transmits an X2 setup request message to base station 2, wherein the message includes information indicating that base station 1 supports low complexity UE. If base station 1 does not support low complexity UE, the information may be absent in the message. Base station 2 transmits an X2 setup response message to base station 1, wherein the message includes information indicating that base station 2 supports low complexity UE. If base station 2 does not support low complexity UE, the information may be absent in the message.

In a third manner, the base station knows whether the neighbor base station supports low complexity UE via operating and maintaining Q&M configurations.

In a fourth manner, the neighbor base station transmits information indicating it supports low complexity UE via an S1 interface, e.g., transmit the information via an eNB configuration transfer and MME configuration transfer.

At block 1102, the base station determines whether hands over the UE to the neighbor base station. For the low complexity UE, if the neighbor base station supports low complexity UE, the base station may hand over the UE to the neighbor base station. If the neighbor base station does not support low complexity UE, the base station does not hand over the UE to the neighbor base station. That is to say, during the handover, the serving base station of the UE hands over the low complexity UE to a base station supporting low complexity UE.

Figure 12:
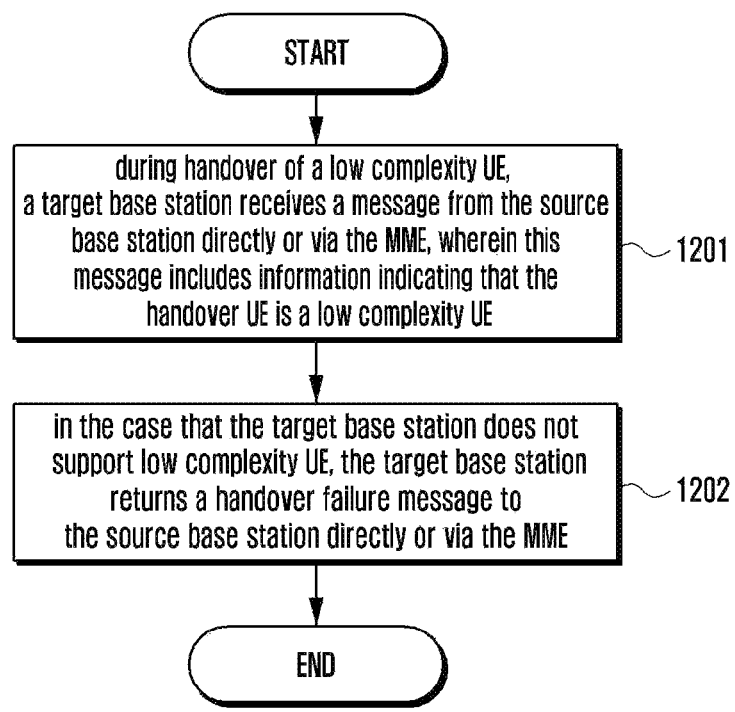
FIG. 12 is a schematic diagram illustrating a second method for supporting access of low complexity UE according to an embodiment of the present disclosure.

FIG. 12 is a schematic diagram illustrating a second method for supporting access of low complexity UE according to an embodiment of the present disclosure. As shown in FIG. 12, this method includes the following.

At block 1201, during handover of a low complexity UE, a target base station receives a message from the source base station directly or via the MME, wherein this message includes information indicating that the UE handed over is a low complexity UE.

At block 1202, in the case that the target base station does not support low complexity UE, the target base station returns a handover failure message to the source base station directly or via the MME, and indicates that the failure reason is the target base station does not support low complexity UE.

Hereinafter the detailed implementation of the above second method for supporting access of low complexity UE is described with reference to two embodiments.

Figure 13:
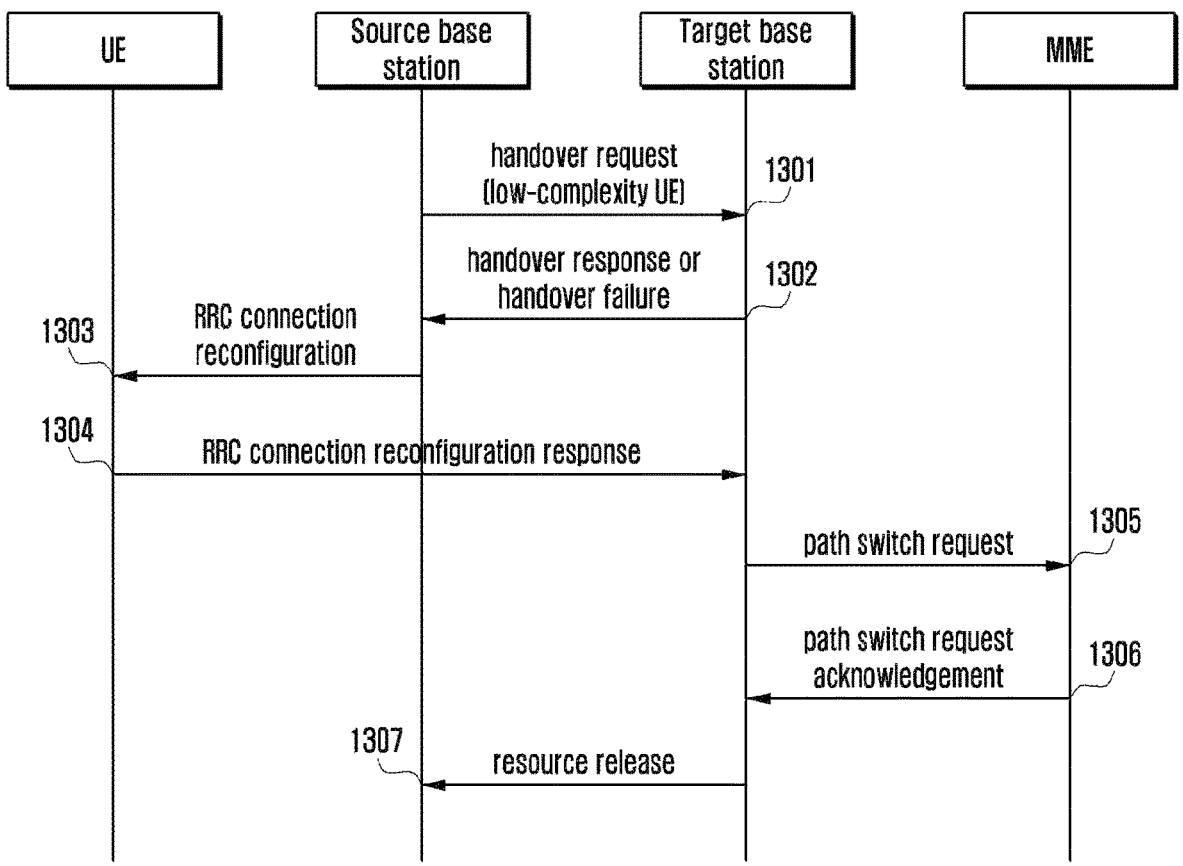
FIG. 13 is a schematic diagram illustrating a first embodiment of the second method for supporting access of low complexity UE according to the present disclosure.

FIG. 13 shows a first embodiment of the second method for supporting access of low complexity UE according to the present disclosure. In this embodiment, the UE performs an X2 handover.

At block 1301, a source base station transmits a handover request message to a target base station. The message includes information indicating whether the UE is a low complexity UE. The target base station saves the information received.

At block 1302, if the UE is a low complexity UE and the target base station supports low complexity UE, the target base station transmits a handover response message to the source base station. If the UE is a low complexity UE but the target base station does not support low complexity UE, the target base station transmits a handover failure message to the source base station. The failure reason is the target base station does not supporting low complexity UE.

In addition, the source base station may save the information indicating that the target base station does not support low complexity UE, and does not initiate handover of low complexity UE to the target base station thereafter.

If the target base station transmits the handover response, block 1303 and subsequent blocks are executed.

At block 1303, the source base station transmits an RRC connection reconfiguration message to the UE.

At block 1304, the UE transmits an RRC connection reconfiguration complete message to the target base station.

At block 1305, the target base station transmits a path switch request message to the MME.

At block 1306, the MME transmits a path switch request acknowledgement message to the target base station.

At block 1307, the target base station transmits a resource release message to the source base station.

Figure 14:
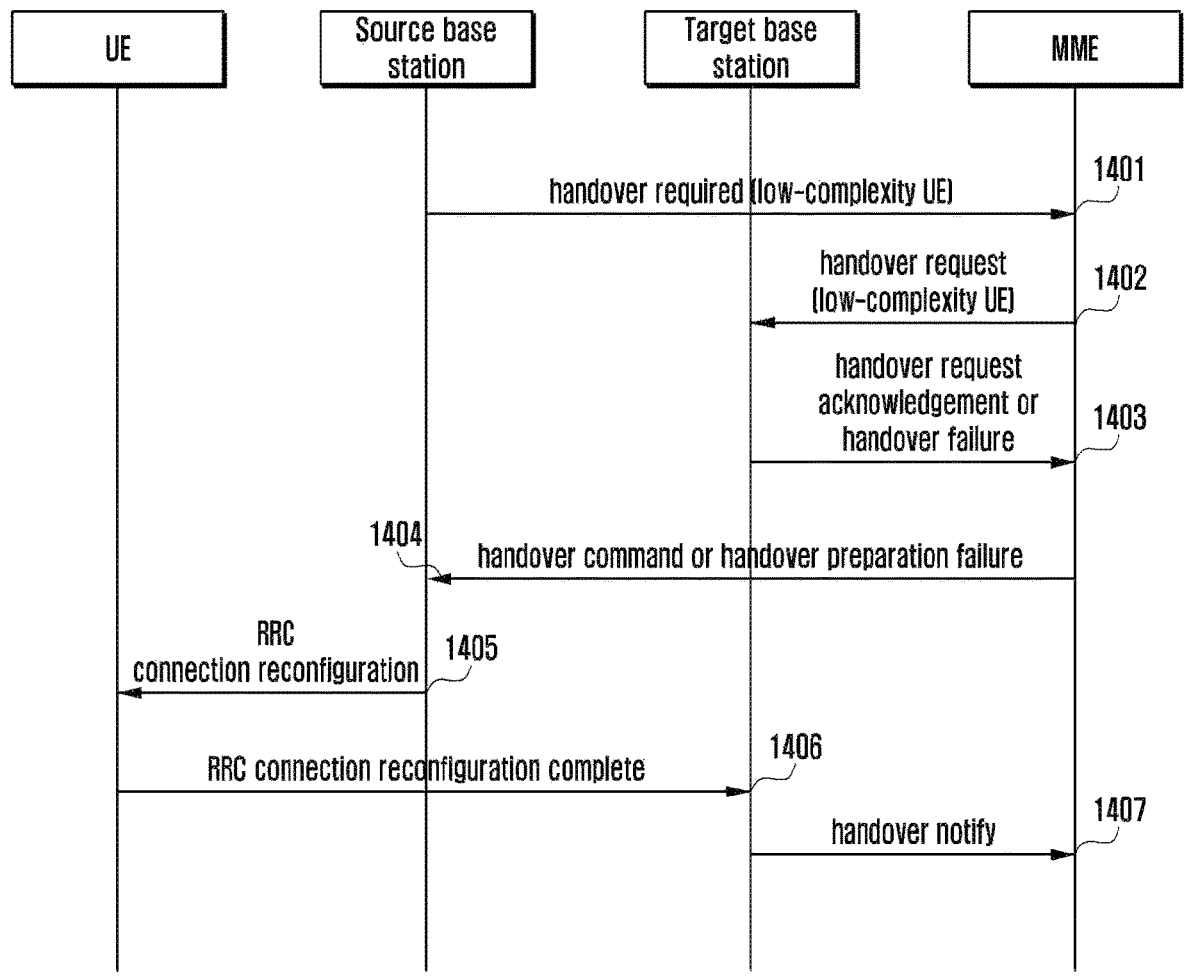
FIG. 14 is a schematic diagram illustrating a second embodiment of the second method for supporting access of low complexity UE according to the present disclosure.

FIG. 14 shows a second embodiment of the second method for supporting access of low complexity UE according to the present disclosure. In this embodiment, the UE performs an S1 handover.

At block 1401, a source base station transmits a handover required message to an MME. The message includes information indicating whether the UE is a low complexity UE. The information may be included in a transparent container from the source base to the target base station or directly included in the message.

At block 1402, the MME transmits a handover request message to the target base station. The message includes information indicating whether the UE is a low complexity UE. The information may be included in a transparent container from the source base station to the target base station or directly included in the message.

The target base station saves the information received.

At block 1403, if the UE is a low complexity UE and the target base station supports low complexity UE, the target base station transmits a handover request acknowledgement message to the MME. If the UE is a low complexity UE but the target base station does not support low complexity UE, the target base station transmits a handover failure message to the MME. The failure reason is that the target base station does not support low complexity UE.

At block 1404, the MME transmits a handover command or a handover preparation failure message to the source base station. If the handover request acknowledgement is received in block 1403, the MME may transmit a handover command to the source base station. If the handover failure message is received in block 1403, the MME transmits a handover preparation failure message to the source base station. In case of failure message, the failure reason is that the target base station does not support low complexity UE.

In addition, the source base station may save the information indicating that the target base station does not support low complexity UE, and does not initiate handover of low complexity UE to the target base station thereafter.

If the source base station receives the handover command, block 1405 and subsequent blocks are executed.

At block 1405, the source base station transmits an RRC connection reconfiguration to the UE.

At block 1406, the UE transmits an RRC connection reconfiguration complete message to the target base station.

At block 1407, the target base station transmits a handover notify message to the MME.

The above describes the detailed implementation of the two methods for supporting access of low complexity UE provided by the present disclosure. The present disclosure further provides apparatuses for supporting access of low complexity UE, applicable for implementing the above methods for supporting access of low complexity UE.

A first apparatus for supporting access of low complexity UE provided by an embodiment of the present disclosure includes: an obtaining unit and a handover unit. The obtaining unit is adapted to obtain information indicating whether an neighbor base station supports low complexity UE. The handover unit is adapted to hand over the UE to the neighbor base station supporting low complexity UE when performing handover of low complexity UE. This apparatus may be used for implementing the first method as shown in FIG. 11.

A second apparatus for supporting access of low complexity UE provide by an embodiment of the present disclosure includes: a receiving unit and a responding unit. The receiving unit is adapted to receive, during handover of a low complexity UE, information indicating that a handover UE is a low complexity UE from a source base station directly or via an MME. The responding unit is adapted to transmit a handover failure message to the source base station directly or via the MME if the target base station of the handover does not support low complexity UE, and indicate that a failure reason is that the target base station does not support low complexity UE. This apparatus may be used for implementing the second method as shown in FIG. 12.

The foregoing descriptions are only preferred embodiments of this disclosure and are not for use in limiting the protection scope thereof. Any changes and modifications can be made by those skilled in the art without departing from the spirit of this disclosure and therefore should be covered within the protection scope as set by the appended claims.

The invention claimed is:

1. A method performed by a base station, the method comprising:
    receiving, from a terminal, a first message for user equipment (UE) capability including information associated with a paging, wherein, in case that the terminal corresponds to a category 0, the first message includes information associated with the paging of the terminal;
    transmitting, to a mobility management entity (MME), a first message including the information associated with the paging of the terminal; and
    receiving, from the MME, a paging message including the information associated with the paging of the terminal included in the first message.

2. The method of claim 1, wherein the information associated with the paging of the terminal included in the first message includes information indicating that the terminal is a low complexity terminal corresponding to the category 0.

3. The method of claim 1, further comprising receiving, from the MME, a second message requesting to report the information associated with the paging of the terminal.

4. The method of claim 3, wherein the second message comprises a path switch request acknowledgement message during an X2 handover and comprises a handover request message during an S1 handover.

5. A method performed by a mobility management entity (MME), the method comprising:
    receiving, from a base station, a first message including information associated with a paging of a terminal, wherein, in case that the terminal corresponds to a category 0, the information associated with the paging of the terminal is received from the terminal; and transmitting, to the base station, a paging message including the information associated with the paging of the terminal included in the first message,
wherein the information associated with the paging of the terminal is obtained, by the base station, from the terminal.

6. The method of claim 5, wherein the information associated with the paging of the terminal included in the first message includes information indicating that the terminal is a low complexity terminal corresponding to the category 0.

7. The method of claim 5, further comprising transmitting, to the base station, a second message requesting to report the information associated with the paging of the terminal.

8. The method of claim 7, wherein the second message comprises a path switch request acknowledgement message during an X2 handover and comprises a handover request message during an S1 handover.

9. A base station comprising:
a transceiver; and
a controller configured to:
control the transceiver to receive, from a terminal, information associated with a paging of the terminal, wherein, in case that the terminal corresponds to a category 0, the information associated with the paging of the terminal is received from the terminal,
control the transceiver to transmit, to a mobility management entity (MME), a first message including the information associated with the paging of the terminal, and
control the transceiver to receive, from the MME, a paging message including the information associated with the paging of the terminal included in the first message.

10. The base station of claim 9, wherein the information associated with the paging of the terminal included in the first message includes information indicating that the terminal is a low complexity terminal corresponding to the category 0.

11. The base station of claim 9, wherein the controller is further configured to control the transceiver to receive, from the MME, a second message requesting to report the information associated with the paging of the terminal.

12. The base station of claim 11, wherein the second message comprises a path switch request acknowledgement message during an X2 handover and comprises a handover request message during an S1 handover.

13. A mobility management entity (MME) comprising:
a transceiver; and
a controller configured to:
control the transceiver to receive, from a base station, a first message including information associated with a paging of a terminal, wherein, in case that the terminal corresponds to a category 0, the information associated with the paging of the terminal is received from the terminal, and
control the transceiver to transmit, to the base station, a paging message including the information associated with the paging of the terminal included in the first message,
wherein the information associated with the paging of the terminal is obtained, by the base station, from the terminal.

14. The MME of claim 13, wherein the information associated with the paging of the terminal included in the first message includes information indicating that the terminal is a low complexity terminal corresponding to the category 0.

15. The MME of claim 13, wherein the controller is further configured to control the transceiver to transmit, to the base station, a second message requesting to report the information associated with the paging of the terminal.

16. The MME of claim 15, wherein the second message comprises a path switch request acknowledgement message during an X2 handover and comprises a handover request message during an S1 handover.

* * * * *